United States Patent
Ghosh et al.

(10) Patent No.: US 9,844,049 B2
(45) Date of Patent: Dec. 12, 2017

(54) APPARATUS, METHOD, AND COMPUTER READABLE MEDIUM FOR INITIATING UPLINK MULTI-USER MEDIUM ACCESS IN HIGH EFFICIENCY WIRELESS LOCAL-AREA NETWORKS

(71) Applicant: Intel IP Corporation, Santa Clara, CA (US)

(72) Inventors: Chittabrata Ghosh, Fremont, CA (US); Robert J. Stacey, Portland, OR (US); Shahrnaz Azizi, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 88 days.

(21) Appl. No.: 14/669,265

(22) Filed: Mar. 26, 2015

(65) Prior Publication Data

US 2016/0198445 A1    Jul. 7, 2016

Related U.S. Application Data

(60) Provisional application No. 62/100,605, filed on Jan. 7, 2015.

(51) Int. Cl.
*H04W 72/04* (2009.01)
*H04J 11/00* (2006.01)
(Continued)

(52) U.S. Cl.
CPC .......... *H04W 72/044* (2013.01); *H04J 11/00* (2013.01); *H04L 5/00* (2013.01); *H04B 7/0452* (2013.01);
(Continued)

(58) Field of Classification Search
CPC  H04W 72/0446; H04W 84/12; H04L 5/0007; H04B 7/0452
See application file for complete search history.

(56) References Cited

U.S. PATENT DOCUMENTS

2011/0096747 A1    4/2011  Seok
2011/0235593 A1    9/2011  Gong et al.
(Continued)

FOREIGN PATENT DOCUMENTS

| CN | 107006007 A | 8/2017 |
|---|---|---|
| DE | 10201520573 A1 | 7/2016 |
| WO | WO-2016111749 A1 | 7/2016 |

OTHER PUBLICATIONS

"International Application Serial No. PCT/US2015/060397, International Search Report dated Mar. 31, 2016", 4 pgs.
(Continued)

*Primary Examiner* — Jackie Zuniga Abad
(74) *Attorney, Agent, or Firm* — Schwegman Lundberg & Woessner, P.A.

(57) ABSTRACT

Apparatus, computer readable medium, and methods for initiating uplink multi-user medium access in high-efficiency wireless local-area networks (WLANs) are disclosed. A station is disclosed comprising circuitry configured to generate a trigger frame comprising one or more resource allocations. Each of the resource allocations may include an indication of whether the resource allocation is an orthogonal frequency division multiple access (OFDMA) resource allocation or a multiple-user multiple-input multiple-output (MU-MIMO) resource allocation. An identity either of an OFDMA group or an MU-MIMO group may be included. Each resource allocation may include an indication of a bandwidth for the OFDMA resource allocation or a bandwidth for the MU-MIMO resource allocation. Each OFDMA resource allocation may include one or more indications of an address of one or more HE stations and one or more indications of an OFDMA sub-channel resource allocation for the corresponding HE station.

21 Claims, 8 Drawing Sheets

(51) Int. Cl.
*H04L 5/00* (2006.01)
*H04B 7/0452* (2017.01)
*H04W 84/12* (2009.01)

(52) U.S. Cl.
CPC ...... *H04J 2011/0009* (2013.01); *H04W 84/12* (2013.01)

(56) References Cited

U.S. PATENT DOCUMENTS

| | | | |
|---|---|---|---|
| 2013/0259017 A1* | 10/2013 | Zhang | H04W 84/02 370/338 |
| 2013/0286959 A1 | 10/2013 | Lou et al. | |
| 2014/0079003 A1 | 3/2014 | Noh et al. | |
| 2014/0328236 A1 | 11/2014 | Merlin et al. | |
| 2016/0105836 A1* | 4/2016 | Seok | H04W 36/32 370/331 |
| 2016/0165589 A1* | 6/2016 | Chu | H04L 5/0007 370/329 |

OTHER PUBLICATIONS

"International Application Serial No. PCT/US2015/060397, Written Opinion dated Mar. 31, 2016", 8 pgs.

"International Application Serial No. PCT/US2015/060397, International Preliminary Report on Patentability dated Jul. 20, 2017", 10 pgs.

* cited by examiner

US 9,844,049 B2

APPARATUS, METHOD, AND COMPUTER READABLE MEDIUM FOR INITIATING UPLINK MULTI-USER MEDIUM ACCESS IN HIGH EFFICIENCY WIRELESS LOCAL-AREA NETWORKS

PRIORITY CLAIM

This application claims the benefit of priority under 35 USC 119(e) to U.S. Provisional Patent Application Ser. No. 62/100,605, filed Jan. 7, 2015, which is incorporated herein by reference in its entirety.

TECHNICAL FIELD

Embodiments pertain to wireless communications in a wireless local-area network (WLAN). Some embodiments relate to Institute of Electrical and Electronic Engineers (IEEE) 802.11. Some embodiments relate to high-efficiency WLANs (HEWs). Some embodiments relate to IEEE 802.11ax. Some embodiments relate to orthogonal frequency division multi-access (OFDMA) and/or multiple-input multiple-output (MIMO) resource allocations transmitted to a plurality of HEW stations by a master station as a trigger frame to initiate an uplink multi-user OFDMA data transmission.

BACKGROUND

Efficient use of the resources of a WLAN is important to provide bandwidth and acceptable response times to the users of the WLAN. However, allocating the resources of the WLAN may require the use of some of the resources of the WLAN, which may make the use of the resources less efficient.

Moreover, often more than one standard may be in use in a WLAN. For example, IEEE 802.11ax, referred to as HEW, may need to be used with legacy versions of IEEE 802.11.

Thus, there are general needs for methods, apparatuses, and computer readable media for allocating resources to users of the WLAN.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
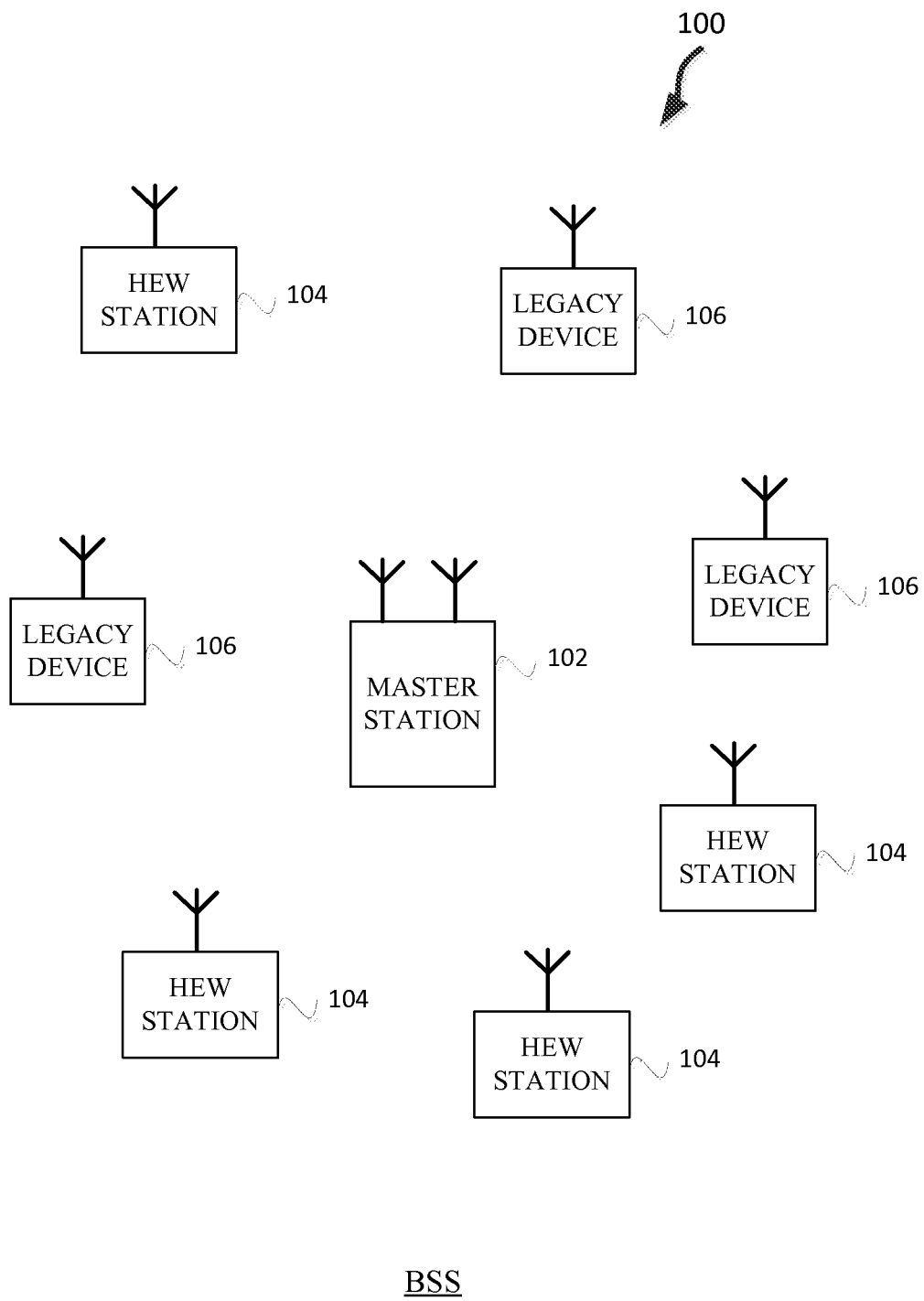
FIG. 1 illustrates a wireless local-area network (WLAN), in accordance with some embodiments.

FIG. 1 illustrates a wireless local-area network (WLAN) in accordance with some embodiments. The WLAN may comprise a basis service set (BSS) 100 that may include a master station 102, which may be an access point (AP); a plurality of high-efficiency wireless (HEW) (e.g., IEEE 802.11 ax) stations 104; and a plurality of legacy (e.g., IEEE 802.11n/ac) devices 106.

The master station 102 may be an access point (AP) using the 802.11 protocol to transmit and receive. The master station 102 may be a base station. The master station 102 may be a master station. The master station 102 may be a HEW master station. The master station 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 protocol may include a multiple access technique. For example, the 802.11 protocol may include space-division multiple access (SDMA) and/or multi-user (MU) multiple-input and multiple-output (MIMO)(MU-MIMO).

The HEW stations 104 may operate in accordance with 802.11ax or another standard of 802.11. The legacy devices 106 may operate in accordance with one or more of 802.11 a/g/ag/n/ac, or another legacy wireless communication standard. The HEW stations 104 may be high efficiency (HE) stations. The legacy devices 106 may be stations.

The HEW stations 104 may be wireless transmit and receive devices such as a cellular telephone, a handheld wireless device, wireless glasses, a wireless watch, a wireless personal device, a tablet, or another device that may be transmitting and receiving using the 802.11 protocol such as 802.11 ax or another wireless protocol.

The BSS 100 may operate on a primary channel and one or more secondary channels or sub-channels. The BSS 100 may include one or more master stations 102. In accordance with embodiments, the master station 102 may communicate with one or more of the HEW stations 104 on one or more of the secondary channels or sub-channels or the primary channel. In example embodiments, the master station 102 communicates with the legacy devices 106 on the primary channel. In example embodiments, the master station 102 may be configured to communicate concurrently with one or more of the HEW stations 104 on one or more of the secondary channels and one or more of the legacy devices 106 utilizing only the primary channel and not utilizing any of the secondary channels.

The master station 102 may communicate with the legacy devices 106 in accordance with legacy IEEE 802.11 communication techniques. In example embodiments, the master station 102 may also be configured to communicate with the HEW stations 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have a same bandwidth as a channel or sub-channel and the bandwidth may be one of 20 MHz, 40 MHz, 80 MHz, 160 MHz, or 320 MHz contiguous bandwidth or an 80+80 MHz (160 MHz) non-contiguous bandwidth. In some embodiments, bandwidths of 1 MHz, 1.25 MHz, 2.5 MHz, 5 MHz, and 10 MHz, or a combination thereof, may also be used. In example embodiments, a channel or sub-channel may be any size less or equal to the bandwidth available. In example embodiments, the sub-channel or channel may be non-contiguous. A HEW frame may be configured for transmitting a number of spatial streams.

In other embodiments, the master station 102, HEW station 104, and/or legacy device 106 may also implement different technologies, such as CDMA2000, CDMA2000 1×, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

In an OFDMA system (e.g., 802.11ax), an associated HEW station 104 may operate on a sub-channel, which may be 20 MHz, of the BSS 100 (that can operate, for example, at 80 MHz). The HEW station 104 may enter a power save mode, and upon coming out of the power save mode, the HEW station 104 may need to re-synchronize with the BSS 100 by receiving a beacon. If the beacon is transmitted only on the primary channel, then the HEW station 104 needs to move and tune to the primary channel upon coming out of the power save mode to be able to receive the beacon. Then the HEW station 104 needs to re-tune back to its operating sub-channel, which may be 20 MHz, or it has to follow a handshake procedure to let the master station 102 know of a new operating sub-channel. The HEW station 104 may risk losing some frames during the channel switch, in example embodiments.

In example embodiments, the HEW station 104 and/or the master station 102 are configured to generate, transmit, receive, and operate in accordance with a trigger frame according to one or more of the embodiments disclosed herein in conjunction with FIGS. 1-8.

Some embodiments relate to high-efficiency wireless communications, including high-efficiency Wi-Fi/WLAN and HEW communications. In accordance with some IEEE 802.11 lax (HEW) embodiments, the master station 102 may operate as a master station which may be arranged to contend for a wireless medium (e.g., during a contention period) to receive exclusive control of the medium for a HEW control period (i.e., a transmission opportunity (TXOP)). The master station 102 may transmit a HEW master-sync transmission or trigger frame at the beginning of the HEW control period. The master station 102 may transmit a time duration of the TXOP. During the HEW control period, the HEW stations 104 may communicate with the master station 102 in accordance with a non-contention-based multiple access technique. This is unlike conventional WLAN communications in which devices communicate in accordance with a contention-based communication technique, rather than a multiple access technique. During the HEW control period, the master station 102 may communicate with the HEW stations 104 using one or more HEW frames. During the HEW control period, the legacy devices 106 may refrain from communicating. In some embodiments, the HEW master-sync transmission may be referred to as a HEW control and schedule transmission or trigger frame.

In some embodiments, the multiple-access technique used during the HEW control period may be a scheduled OFDMA technique, although this is not a requirement. In some embodiments, the multiple access technique may be a TDMA technique or a frequency division multiple access (FDMA) technique. In some embodiments, the multiple access technique may be an SDMA technique.

The master station 102 may also communicate with the legacy devices 106 in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

Figure 2:
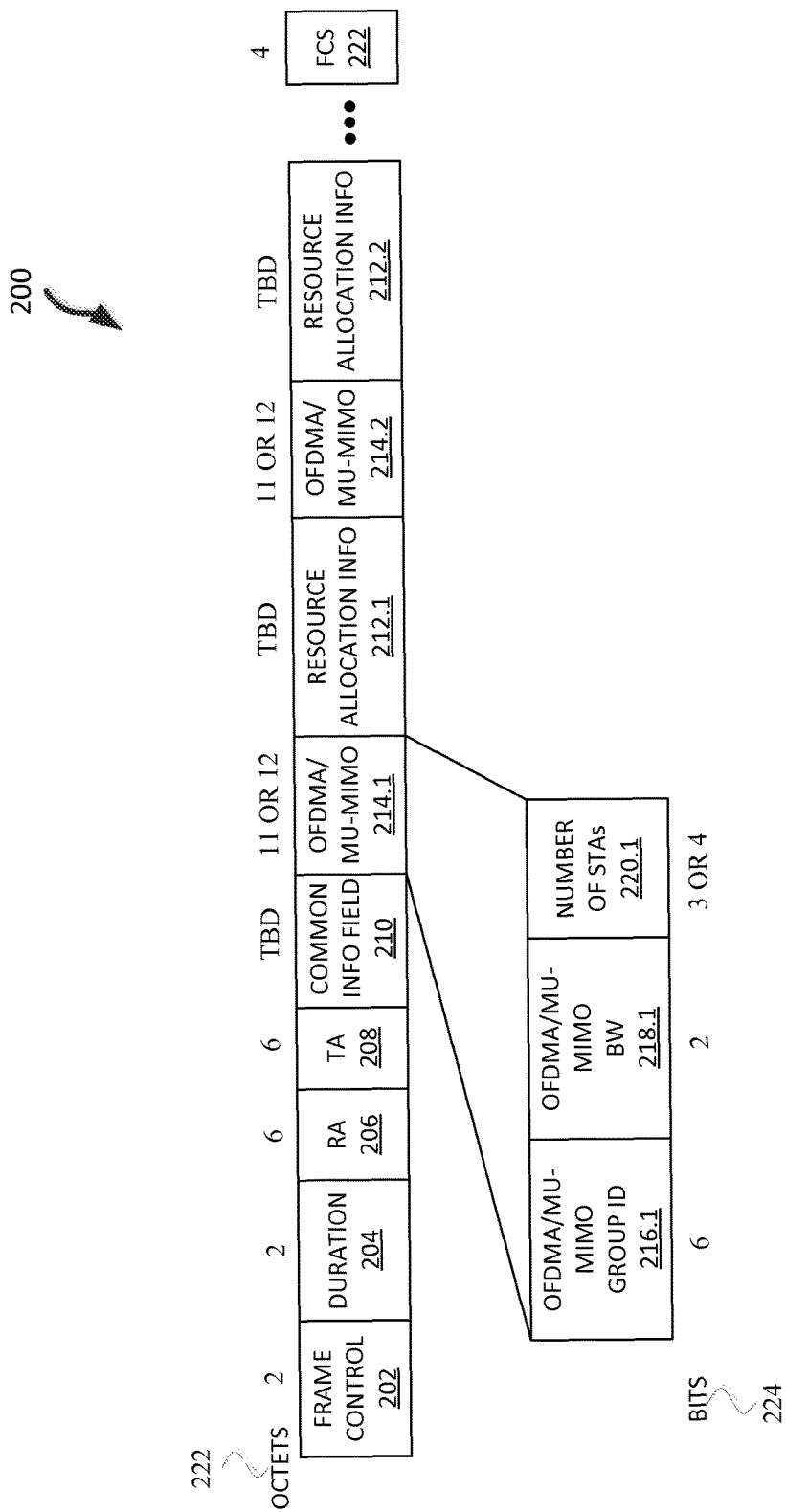
FIG. 2 illustrates a trigger frame according to example embodiments.

FIG. 2 illustrates a trigger frame (TF) 200 according to example embodiments. The trigger frame 200 may include a frame control 202 field, a duration 204 field, a receiver address (RA) 206 field, a transmitter address (TA) 208 field, a common information 210 field, an OFDMA or MU-MIMO 214 field, a resource allocation information 212 field, and a frame check sequence (FCS) 222 field. An example number of octets 222 is illustrated above each field. For example, the duration 204 field may be 2 octets. TBD may indicate that the number of octets 222 is to be determined (TBD).

The frame control 202 field may indicate that the trigger frame 200 is a control frame by specific values in type and sub-type sub-fields. The duration 204 field may be a duration of an uplink multi-user transmission opportunity (UL MU TXOP). The TF 200 may be for one or more HEW stations 104. The duration of the UL MU TXOP may be until the end of acknowledgements (ACK) or block ACKs (BA) from the master station 102 where the master station 102 sends ACKs or BAs in response to data transmitted by the HEW stations 104 in the UL MU TXOP.

The RA 206 field may indicate a receiver address of the first HEW station 104 assigned either an OFDMA sub-channel or a spatial stream, whose resource allocation is indicated in the first sub-field of the resource allocation information 212.1 field. For example, the RA 206 field may indicate the same HEW station 104 that PAID/AID 402.1 (FIG. 4) indicates.

The TA 208 field may indicate the address of the master station 102 that transmitted the trigger frame 200. The HEW station 104 indicated by the RA 206 field may be associated with the master station 102. The common information 210 field may consist of a number of sub-fields as described in conjunction with FIG. 3.

The OFDMA or MU-MIMO 214 field may include sub-fields including an OFDMA or MU-MIMO group identification (ID) 216 sub-field, an OFDMA or MU-MIMO bandwidth (BW) 218 sub-field, and a number of STAs 220 sub-field. An example number of bits 224 is illustrated below each sub-field. The OFDMA or MU-MIMO group ID 216 sub-field may identify an OFDMA group or an MU-MIMO group to which a HEW station 104 may belong. The HEW station 104 may be configured to check the OFDMA or MU-MIMO 214 field to determine if the corresponding resource allocation information 212 includes an allocation for the HEW station 104. The OFDMA or MU-MIMO bandwidth (BW) 218 sub-field may indicate a bandwidth for the resource allocation information 212. For example, for OFDMA, the OFDMA or MU-MIMO BW 218 sub-field may indicate whether the allocation is for 80 MHz, 160 MHz, or 320 MHz. The number of STAs 220 sub-field may indicate the number of stations that are allocated resources in the resource allocation information 212 field. The OFDMA or MU-MIMO 214 field may be repeated once for each resource allocation information 212 field.

Figure 4:
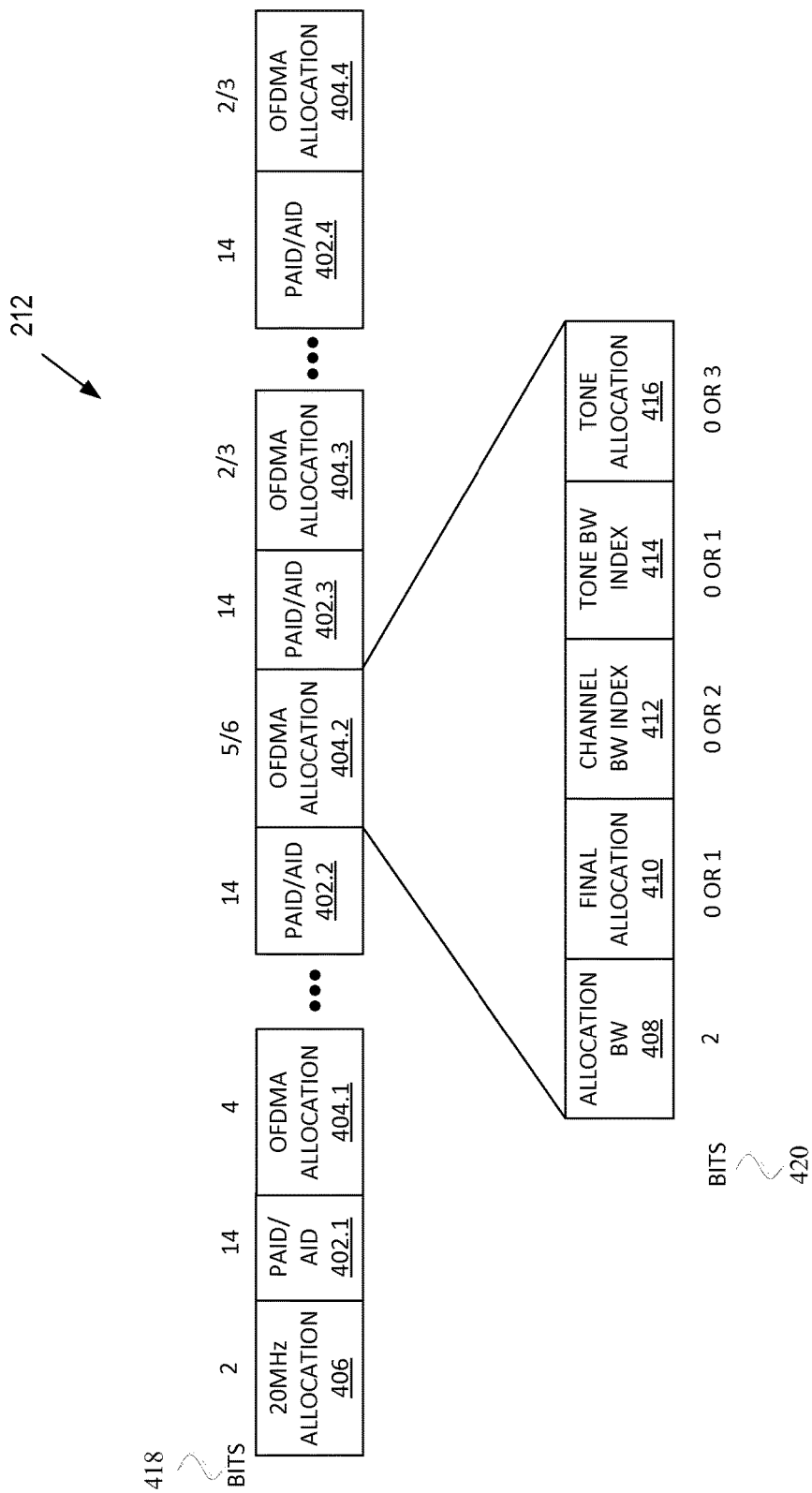
FIG. 4 illustrates a resource allocation information field in the trigger frame according to example embodiments.

The resource allocation information 212 field is described in conjunction with FIG. 4. The FCS 220 field may include information that may be used to verify the correctness of the TF 200. For example, the FCS 220 may include a cyclic redundancy code (CRC).

Figure 3:
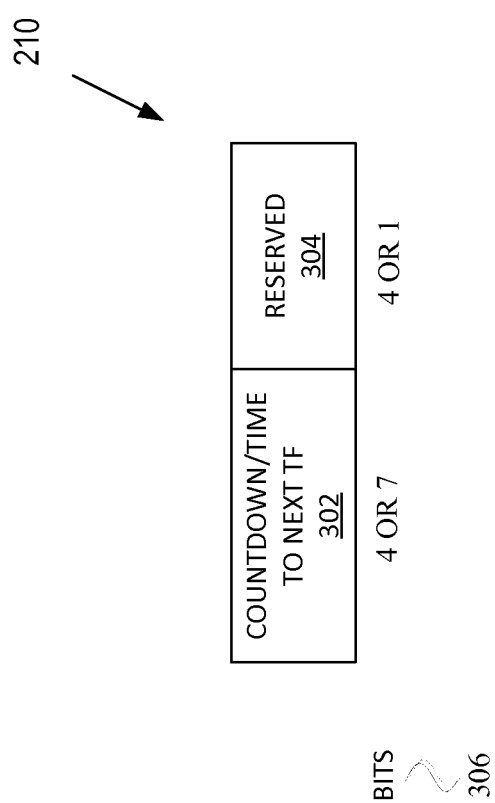
FIG. 3 illustrates a common information field in the trigger frame according to example embodiments.

FIG. 3 illustrates the common information 210 field in the trigger frame according to example embodiments. The common information 210 field may include sub-fields including a countdown or time to next TF 302 sub-field and a reserved 304 sub-field. An example number of bits 306 is illustrated below each sub-field. The countdown or time to next TF 302 sub-field may indicate a countdown value to the next TF 200. There may be a total number of TFs 200 scheduled within a beacon interval (BI) indicated in a beacon frame (not illustrated), which may be transmitted by the master station 102. The beacon frame may consist of a periodic/aperiodic TF field, and a countdown value may be indicated if the value in the periodic/aperiodic TF field indicates that the TF 200 is periodic. A value of 1 or true may indicate that the TF 200 is periodic.

In example embodiments, a maximum of 16 TFs 200 may be scheduled within a BI, which may have a duration of about half of the BI of a typical TXOP having a duration of 2-4 ms. If the value in the periodic/aperiodic TF field indicates that the TF 200 is aperiodic, then the countdown/time to next TF 302 sub-field may indicate a time value to the next scheduled TF 200, and the time may be expressed in time units (TUs).

FIG. 4 illustrates a resource allocation information 212 field in the trigger frame 200 according to example embodiments. The resource allocation information 212 field may include a 20 MHz allocation 406 field, a partial association identification (PAID) or association identification (AID) 402 field, and an OFDMA allocation 404 field. The resource allocation information 212 field may include multiple pairs of PAID or AID 402 fields and OFDMA allocation 404 fields.

The 20 MHz allocation 406 field may indicate the total number of 20 MHz allocations and the number of stations the 20 MHz allocations are for in the resource allocation information 212 field. In example embodiments, the 20 MHz allocation 406 field may be 2 bits 418. In example embodiments, the values in the 2 bits 418 in the 20 MHz allocation 406 field may represent the following allocations.

TABLE 1

Example Embodiment of 20 MHz Allocation 406 Field

| 20 MHz allocation bit value | Allocation Indication |
|---|---|
| 00 | No 20 MHz channel BW allocation |
| 01 | Only 1 allocation of 20 MHz channel BW |
| 10 | Two allocations of 20 MHz channel BW to either 1 or 2 STAs |
| 11 | Three allocations of 20 MHz channel BW to 1 or multiple STAs |

In example embodiments, all 20 MHz channel BW allocations are signaled prior to the indication of any sub-channel allocations to the stations. The PAID or AID 402 field may be an identity of the HEW station 104 for the allocation indicated in the corresponding OFDMA allocation 404 field. In example embodiments, the PAID or AID 402 field may be 14 bits 418. The HEW stations 104 identified by the PAID or AID 402 may be part of the group identified in the OFDMA or MU-MIMO group ID 216 (FIG. 2). The first PAID or AID 402 may identify the same HEW station 104 identified by the RA 206 (FIG. 2).

The OFDMA allocation 404 field may include an allocation bandwidth (BW) 408 sub-field, a final allocation 410 sub-field, a channel BW index 412 sub-field, a tone BW index 414 sub-field, and a tone allocation 416 sub-field. An example number of bits 420 is illustrated below each sub-field. In example embodiments, the OFDMA allocation 404 field may be 2 to 9 bits 418.

The allocation BW 408 sub-field may indicate the sub-channel BW allocated to a HEW station 104 identified by the corresponding PAID or AID 402 field. In example embodiments, the allocation BW 408 sub-field may have the values illustrated in Table 2 with the indicated allocation.

TABLE 2

Example Embodiment of Allocation BW 408 Sub-Field

| Allocation BW 408 sub-field bit value | Allocation Indication |
|---|---|
| 00 | One set of 26 (1*26) tones are allocated. |
| 01 | Two consecutive sets of 26 (2*26) tones are allocated. |
| 10 | Three consecutive sets of 26 (3*26) tones are allocated. |
| 11 | Four contiguous or non-contiguous sets of 26 (4*26) tones are allocated. |

The allocation BW 408 sub-field may be ignored for signaling of 242 tone allocations. The final allocation 410 sub-field may be a bit that indicates whether the master station 102 has allocated non-contiguous or contiguous sets of tones for an allocation BW of either 26 tones or 242 tones. For example, for an allocation BW 408 value of 11, the 4 sets of 26 tones may be assigned adjacent to each other or in a non-contiguous manner. If the final allocation 410 sub-field indicates a non-contiguous allocation, the master station 102 may indicate the first allocation of 2 sub-channels of 26 tones each with the final allocation 410 sub-field set to 0 and another 2 sub-channels of 26 tones each with the final allocation 410 sub-field set to 1.

In example embodiments, for the cases of values 00, 01, and 10 for the allocation BW 408 sub-field, the final allocation 410 sub-field is ignored or may not be present. In the case of value 11 in the allocation BW 408 sub-field, the final allocation 410 sub-field may always be part of the OFDMA allocation 404 field. In example embodiments, if the final allocation 410 sub-field is set to 1, then it means that the 4 sub-channels of 26 tones each are assigned in a contiguous manner.

The following describes an example in accordance with some embodiments. If the value in the allocation BW 408 sub-field is 11 and the value in the final allocation 410 sub-field is 0, then the HEW station 104 identified by the PAID or AID 402 is allocated two 26 tone sub-channels following the previous HEW station's 104 allocation. If the value in the allocation BW 408 sub-field is 11 and the value in the final allocation 410 sub-field is 1, then the HEW station 104 identified by the PAID or AID 402 is allocated all 4 sub-channels contiguously following the previous HEW station's 104 allocation.

If there is a 242 tone allocation indicated by the channel BW index 412 sub-field, a value of 0 in the final allocation 410 sub-field indicates that there is a following 242 tone allocation for the same HEW station 104.

Figure 5:
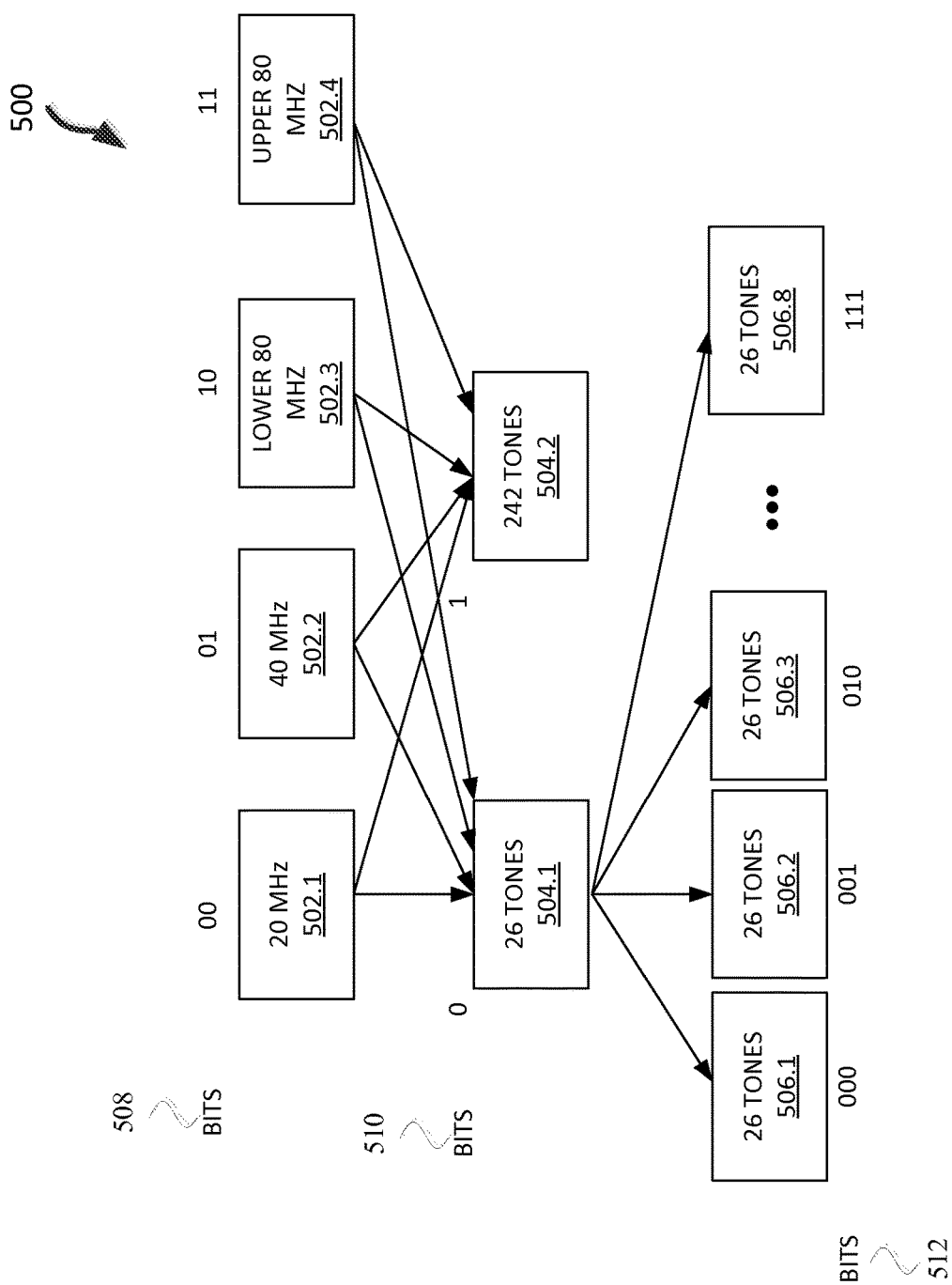
FIG. 5 illustrates a hierarchical signaling used for OFDMA-based resource allocation indications, according to example embodiments.

The channel BW index 412 sub-field, tone BW index 414 sub-field, and tone allocation 416 sub-field are described in conjunction with FIG. 5. FIG. 5 illustrates a hierarchical signaling 500 used for OFDMA-based resource allocation indications, according to example embodiments. Illustrated in FIG. 5 are 20 MHz channels 502, tone bandwidths 504, tone allocations 506, and bits 508, 510, 512.

The channel BW index 412 sub-field may indicate the index of the 20 MHz channel 502 assigned to the HEW station 104 out of the four 20 MHz channels 502 within an 80 MHz operation BW. The channel BW index 412 sub-field may be included for a 242 tone allocation to a HEW station 104 and for an indication of the first HEW station 104 with a 26 tone allocation. For indication of resource allocations for HEW stations 104 after the first HEW station 104, the channel BW index 412 sub-field may be ignored. The channel BW index 412 sub-field may be two bits 508.

The tone BW index 414 sub-field may indicate the basic resource unit, either 26 tones 504.1 or 242 tones 504.2, allocated to the HEW station 104. The tone BW index 414 sub-field may represent the second tier of the hierarchical signaling 500. In example embodiments, if the tone BW index 414 sub-field is set to 0, it indicates that the master station 102 allocates a basic resource unit of 26 tones. If the tone BW index 414 sub-field is set to 1, it indicates that the basic resource unit is 242 tones or a 20 MHz channel BW. The tone BW index 414 sub-field may be one bit 510.

In example embodiments, the tone allocation 416 sub-field indicates the last sub-channel that is allocated to the corresponding HEW station 104. The tone allocation 416 sub-field may be three bits 512. A HEW station 104 may decode the tone allocation 416 sub-field, and based on the allocation BW 408 sub-field, may interpret the preceding number of sub-channels allocated to the HEW station 104. In example embodiments, if the value in the tone allocation 416 sub-field is 010 506.3 with the allocation BW 408 sub-field set to 10 (see Table 2) and the allocation is the first allocation in the resource allocation information 212, then the HEW station 104 interprets that three 26 tone sub-channels (3*26 tones) with indexes 000, 001, and 010 are assigned to the HEW station 104. In this case, the channel BW index 412 sub-field may be any one of the values 00, 01, 10, or 11, and the tone BW index 414 sub-field would be 0 for 26 tones 504.1.

If the tone BW index 414 sub-field is set to 1, then the tone allocation 416 sub-field may be ignored. In the case of an indication of the first 26 tones allocated to a HEW station 104, the tone allocation 416 field may be ignored, as the number and range of sub-channels assigned can be obtained from the allocation BW 408 sub-field.

Figure 6:
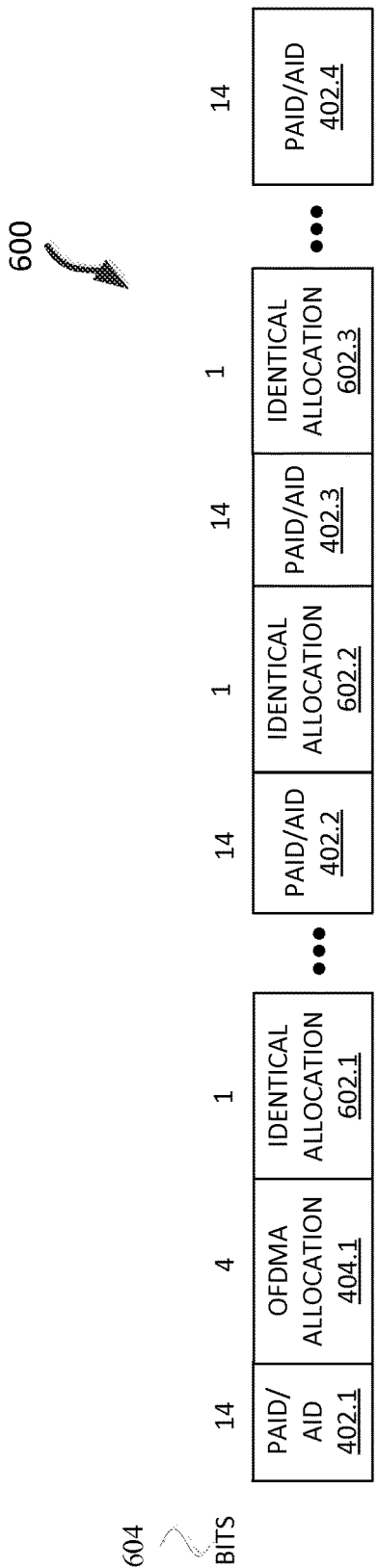
FIG. 6 illustrates an alternative signaling approach for the resource allocation information according to example embodiments.

FIG. 6 illustrates an alternative signaling approach 600 for the resource allocation information 212 according to example embodiments. Illustrated in FIG. 6 are the PAID or AID 402 field, the OFDMA allocation 404 field, an identical allocation 602 field, and bits 604. The identical allocation 602 field may be included with each OFDMA allocation 404 field to indicate that the allocation of the HEW station 104 indicated by the subsequent PAID or AID 402 is identical to the OFDMA allocation 404. For example, if identical allocation 602.1 indicates that the allocation is identical (e.g., a 1 or true), then the allocation for the HEW station 104 indicated by the PAID or AID 402.2 is identical to the allocation for the HEW station 104 indicated by the PAID or AID 402.1. Identical allocation may mean that the resource allocation is the same in terms of 26 tones and allocation in the following 242 tone allocation. For example, an identical allocation may mean that the following allocation of three sets of 26 tones is for the next three sets of 26 tones, or that the following allocation of 242 tones is for a 242 tone allocation in the next 20 MHz channel.

Figure 7:
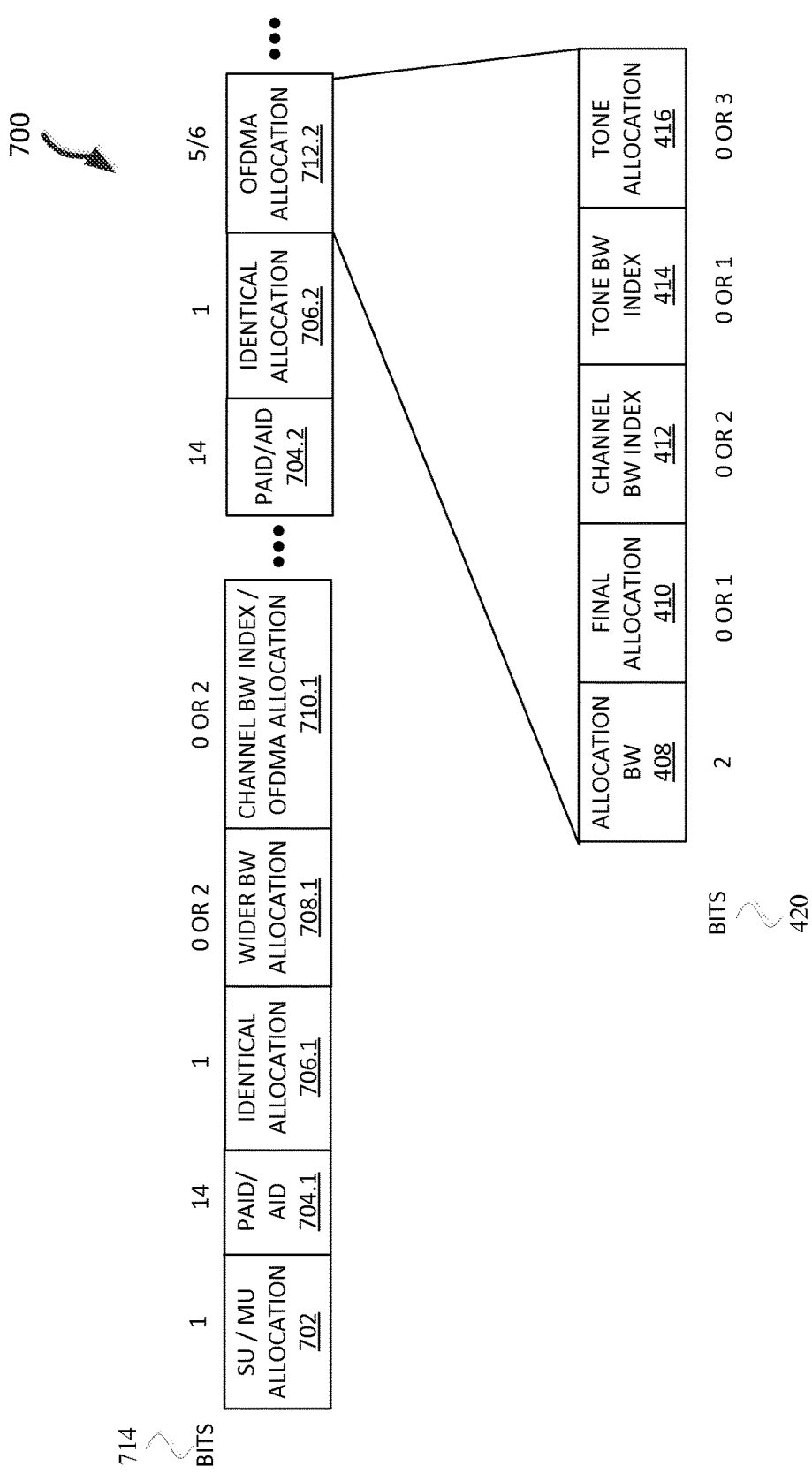
FIG. 7 illustrates an alternative format for the resource allocation information field according to example embodiments.

FIG. 7 illustrates an alternative format for a resource allocation information 700 field according to example embodiments. The resource allocation information 700 field may include a SU or MU allocation 702 field, PAID or AID 704 field, identical allocation 706 field, wider BW allocation 708 field, channel BW index or OFDMA allocation 710 field, and OFDMA allocation 712 field. Bits 714 may be an example number of bits for each of the fields.

The SU/MU allocation 702 field may indicate an allocation of 80 MHz channel BW to one HEW station 104 or more than one HEW station 104, which may be mode I support. A SU allocation may be indicated with a value of 0 in the SU or MU allocation 702 field. In a SU allocation, only the following PAID/AID 704.1 field is valid and all other fields are ignored.

The identical allocation 706 field may indicate an identical allocation to that of the HEW station 104 identified by the PAID/AID 704 field. The identical allocation may indicate an allocation with the same number of tones as the previous HEW station's 104 allocation, which may be indicated by the value in the wider BW allocation 708 field.

The wider BW allocation 708 field indicates the options of wider bandwidth allocations either to one or more HEW stations 104. In example embodiments, the values in the 2 bits in this field indicate the allocations in accordance with Table 3.

TABLE 3

| Wider BW Allocation 708 | |
|---|---|
| Wider BW allocation 708 field value | Allocation Indication |
| 00 | Lower 40 MHz channel BW allocation (Mode II + IV support) |
| 01 | Upper 40 MHz channel BW allocation (Mode II + IV support) |
| 10 | 20 MHz channel BW allocation (Mode III + IV support) |
| 11 | Narrow (10 MHz or less) channel BW allocation |

If the value in the wider BW allocation 708 field is either 00, 01, or 10, the following field is interpreted as the channel BW index 710 field. The OFDMA allocation 712 field may include the allocation BW 408 sub-field, final allocation 410 sub-field, channel BW index 412 sub-field, tone BW index 414 sub-field, and tone allocation 416 sub-field as described in conjunction with FIG. 4. The example number of bits 420 is illustrated below each sub-field.

Figure 8:
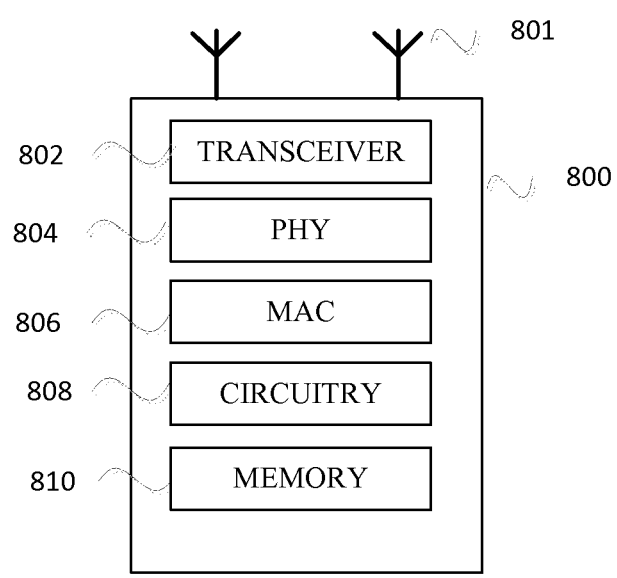
FIG. 8 illustrates a HEW station and/or master station in accordance with some embodiments.

FIG. 8 illustrates a HEW station and/or master station 800 in accordance with some embodiments. The HEW station and/or master station 800 may be a HEW compliant device that may be arranged to communicate with one or more other HEW devices, such as the HEW stations 104 (FIG. 1) or the master station 102 (FIG. 1), as well as to communicate with the legacy devices 106 (FIG. 1). The HEW stations 104 and master station 102 may also be referred to as HEW devices. The HEW station and/or master station 800 may be suitable for operating as the master station 102 (FIG. 1) or a HEW station 104 (FIG. 1). In accordance with embodiments, the HEW station and/or master station 800 may include, among other things, a transmit/receive element such as an antenna 801, a transceiver 802, physical layer circuitry (PHY) 804, and medium-access control layer circuitry (MAC) 806. The PHY 804 and MAC 806 may be HEW compliant layers and may also be compliant with one or more legacy IEEE 802.11 standards. The MAC 806 may be arranged to configure physical protocol data units (PPDUs) and arranged to transmit and receive PPDUs, among other things. The HEW station and/or master station 800 may also include other circuitry 808 and memory 810 configured to perform the various operations described herein. The circuitry 808 may be hardware processing circuitry. The circuitry 808 may be coupled to the transceiver 802, which may be coupled to the transmit/receive element 801. While FIG. 8 depicts the circuitry 808 and the transceiver 802 as separate components, the circuitry 808 and the transceiver 802 may be integrated together in an electronic package or chip.

In some embodiments, the MAC 806 may be arranged to contend for a wireless medium during a contention period to receive control of the medium for the HEW control period and configure a HEW PPDU. In some embodiments, the MAC 806 may be arranged to contend for the wireless medium based on channel contention settings, a transmitting power level, and a clear channel assessment (CCA) level.

The PHY 804 may be arranged to transmit the HEW PPDU. The PHY 804 may include circuitry for modulation/demodulation, upconversion/downconversion, filtering, amplification, etc. In some embodiments, the hardware processing circuitry 808 may include one or more processors. The hardware processing circuitry 808 may be configured to perform functions based on instructions being stored in a RAM or ROM, or based on special purpose circuitry. In some embodiments, the hardware processing circuitry 808 may be configured to generate, transmit, receive, and operate in accordance with the trigger frame according to one or more of the embodiments disclosed herein in conjunction with FIGS. 1-8.

In some embodiments, two or more antennas 801 may be coupled to the PHY 804 and arranged for sending and receiving signals including transmission of HEW packets. The transceiver 802 may transmit and receive data such as HEW PPDUs and packets that include an indication that the HEW station and/or master station 800 should adapt the channel contention settings according to settings included in the packet. The memory 810 may store information for configuring the other circuitry to perform operations for generating, transmitting, receiving, and operating in accordance with the trigger frame according to one or more of the embodiments disclosed herein in conjunction with FIGS. 1-8.

In some embodiments, the HEW station and/or master station 800 may be configured to communicate using OFDMA communication signals over a multicarrier communication channel. In some embodiments, the HEW station and/or master station 800 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect, as the HEW station and/or master station 800 may also be suitable to transmit and/or receive communications in accordance with other techniques and standards. In some embodiments, the HEW station and/or master station 800 may use 4× symbol duration of 802.11n or 802.11ac.

In some embodiments, the HEW station and/or master station 800 may be part of a portable wireless communication device or mobile device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a base station, a transmit/receive device for a wireless standard such as 802.11 or 802.16, or another device that may receive and/or transmit information wirelessly. In some embodiments, the portable wireless communication device may include one or more of a keyboard, a display, a non-volatile memory port, multiple antennas 801, a graphics processor, an application processor, speakers, and other portable wireless communication device elements. The display may be an LCD screen including a touch screen.

The antennas 801 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 801 may be effectively separated to take advantage of spatial diversity and the different channel characteristics that may result.

Although the HEW station and/or master station 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The following examples pertain to further embodiments. Example 1 is a master station. The master station may include circuitry configured to generate a trigger frame (TF) comprising one or more resource allocations, where each of the one or more resource allocations includes an indication of whether the resource allocation is an orthogonal frequency division multiple access (OFDMA) resource allocation or a multiple-user multiple-input multiple-output (MU-MIMO) resource allocation, and an identity either of an OFDMA group or an MU-MIMO group. Each resource allocation may include an indication of a bandwidth for the OFDMA resource allocation or a bandwidth for the MU-MIMO resource allocation. The circuitry may be configured to transmit the TF.

In Example 2, the subject matter of Example 1 can optionally include where the circuitry is configured to transmit the TF to a plurality of HEW stations to initiate simultaneous uplink or downlink transmissions form/to the plurality of stations within a transmission opportunity obtained by the master station, and wherein the TF includes an indication of a duration of the transmission opportunity.

In Example 3, the subject matter of Examples 1 or 2 can optionally include where each OFDMA resource allocation comprises one or more indications of an address of one or more HEW stations and one or more indications of an OFDMA sub-channel resource allocation for the corresponding HEW station.

In Example 4, the subject matter of Example 3 can optionally include where each OFDMA resource allocation further comprises a 20 MHz allocation sub-field that indicates a number of 20 MHz sub-channels allocated in the OFDMA resource allocation.

In Example 5, the subject matter of Example 3 can optionally include where the one or more indications of the OFDMA sub-channel resource allocation for the corresponding HEW station further includes an indication of whether the OFDMA sub-channel resource allocation for the corresponding HEW station is final or whether the one or more indications of the OFDMA sub-channel resource allocations include an additional OFDMA sub-channel resource allocation for the corresponding HEW station.

In Example 6, the subject matter of Example 4 can optionally include where the one or more indications of the OFDMA sub-channel resource allocation for the corresponding HEW station further comprise an indication of a location of the number of 20 MHz sub-channels.

In Example 7, the subject matter of Example 4 can optionally include where the one or more indications of the OFDMA sub-channel resource allocation for the corresponding HEW station further comprise an indication of whether a basic resource unit of the one or more indications of the OFDMA sub-channel resource allocation for the corresponding HEW station is 26 tones or 242 tones.

In Example 8, the subject matter of Example 4 can optionally include where the one or more indications of the OFDMA sub-channel resource allocation for the corresponding HEW station further comprise an indication of a last sub-channel that is allocated to the corresponding HEW station within the number of 20 MHz sub-channels.

In Example 9, the subject matter of Example 4 can optionally include where the 20 MHz allocation sub-field further indicates a bandwidth for the OFDMA sub-channel resource allocation.

In Example 10, the subject matter of Example 9 can optionally include where the 20 MHz allocation sub-field indicates one from the following group: zero 20 MHz sub-channels are allocated in the OFDMA resource allocation, one 20 MHz sub-channel is allocated in the OFDMA resource allocation, two 20 MHz sub-channels are allocated to one or two HEW stations of the one or more HEW stations in the OFDMA resource allocation, and three 20 MHz sub-channels are allocated to one or more HEW stations of the one or more HEW stations in the OFDMA resource allocation.

In Example 11, the subject matter of Example 3 can optionally include where each OFDMA resource allocation further comprises an indication of whether the one or more indications of the OFDMA sub-channel resource allocation for the corresponding HEW station is a same resource allocation as a resource allocation of a previous HEW station.

In Example 12, the subject matter of Examples 1 or 2 can optionally include where each OFDMA resource allocation comprises one or more indications of an address of one or more HEW stations, and one or more indications of a width of an OFDMA sub-channel resource allocation for the corresponding HEW station.

In Example 13, the subject matter of Example 12 can optionally include wherein each OFDMA resource allocation further comprises an indication of whether the OFDMA resource allocation is for a single HEW station of 80 MHz or for a plurality of HEW stations each of less than 80 MHz.

In Example 14, the subject matter of Example 13 can optionally include where each OFDMA resource allocation further comprises an indication of a position with a bandwidth of the OFDMA sub-channel resource allocation for the corresponding HEW station.

In Example 15, the subject matter of Examples 1 or 2 can optionally include where the TF further comprises a countdown or time to next TF, where the countdown indicates a number of remaining transmission opportunities in a group of transmission opportunities, and where the time to next TF indicates when a next TF will be transmitted.

In Example 16, the subject matter of Examples 1 or 2 can optionally include where the master station is one from the following group: an access point, an Institute of Electrical and Electronic Engineers (IEEE) 802.11 access point, an IEEE 802.11 station, an IEEE 802.11ax access point, and an IEEE 802.11ax station.

In Example 17, the subject matter of Examples 1 or 2 can optionally include where each resource allocation comprises an indication of a number of one or more HEW stations.

In Example 18, the subject matter of Example 1 can optionally include memory coupled to the circuitry, and one or more antennas coupled to the circuitry.

Example 19 is a method performed by an access point (AP). The method includes generating a trigger frame (TF) comprising one or more resource allocations, wherein each of the one or more resource allocations comprises an indication of whether the resource allocation is an orthogonal frequency division multiple access (OFDMA) resource allocation or a multiple-user multiple-input multiple-output (MU-MIMO) resource allocation, and an identity either of an OFDMA group or an MU-MIMO group, and where each resource allocation comprises an indication of a bandwidth for the OFDMA resource allocation or a bandwidth for the MU-MIMO resource allocation. The method may include transmitting the TF.

In Example 20, the subject matter of Example 19 can optionally include where transmitting is transmitting the TF to a plurality of HEW stations to initiate simultaneous uplink or downlink transmissions form/to the plurality of stations within a transmission opportunity obtained by the master station, and wherein the TF includes an indication of a duration of the transmission opportunity.

In Example 21, the subject matter of Examples 19 or 20 can optionally include where transmitting is transmitting the TF to a plurality of HEW stations to initiate simultaneous uplink or downlink transmissions form/to the plurality of stations within a transmission opportunity obtained by the master station, and wherein the TF includes an indication of a duration of the transmission opportunity. In Example 21, The method of claim 19, wherein each OFDMA resource allocation comprises one or more indications of an address of one or more HEW stations and one or more indications of an OFDMA sub-channel resource allocation for the corresponding HEW station.

Example 22 is a station. The station may include circuitry configured to receive a trigger frame (TF) from a master station comprising one or more resource allocations, wherein each of the one or more resource allocations comprises an indication of whether the resource allocation is an orthogonal frequency division multiple access (OFDMA) resource allocation or a multiple-user multiple-input multiple-output (MU-MIMO) resource allocation, and an identity either of an OFDMA group or an MU-MIMO group, and wherein each resource allocation comprises an indication of a bandwidth for the OFDMA resource allocation or a bandwidth for the MU-MIMO resource allocation; and transmit data to the master station in accordance with the TF.

In Example 23, the subject matter of Example 22 can optionally include where each OFDMA resource allocation comprises one or more indications of an address of one or more HEW stations and one or more indications of an OFDMA sub-channel resource allocation for the corresponding HEW station.

In Example 24, the subject matter of Examples 22 or 23 can optionally include memory coupled to the circuitry, and one or more antennas coupled to the circuitry.

Example 25 is a non-transitory computer-readable storage medium that stores instructions for execution by one or more processors. The instructions configure the one or more processors to cause a master station to: generate a trigger frame (TF) comprising one or more resource allocations, where each of the one or more resource allocations comprises an indication of whether the resource allocation is an orthogonal frequency division multiple access (OFDMA) resource allocation or a multiple-user multiple-input multiple-output (MU-MIMO) resource allocation, and an identity either of an OFDMA group or an MU-MIMO group, and where each resource allocation comprises an indication of a bandwidth for the OFDMA resource allocation or a bandwidth for the MU-MIMO resource allocation; and transmit the TF.

In Example 26, the subject matter of Example 25 can optionally include where each OFDMA resource allocation comprises one or more indications of an address of one or more HEW stations and one or more indications of an OFDMA sub-channel resource allocation for the corresponding HEW station.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a master station, the master station comprising: memory; and, circuitry coupled to the memory, the circuitry configured to:
generate a trigger frame (TF) comprising one or more resource allocations for simultaneous uplink transmissions, wherein each of the one or more resource allocations comprises an indication of whether the resource allocation is an orthogonal frequency division multiple access (OFDMA) resource allocation or a multiple-user multiple-input multiple-output (MU-MIM) resource allocation, and an identity either of an OFDMA group or an MU-MIMO group, and wherein each resource allocation comprises an indication of a bandwidth for the OFDMA resource allocation or a bandwidth for the MU-MIMO resource allocation, wherein each OFDMA resource allocation comprises one or more indications of an address of a plurality of high-efficiency (HE) stations and one or more indications of an OFDMA sub-channel resource allocation for a corresponding HE station, wherein the TF further comprises an indication of a duration of a transmission opportunity obtained by the master station and an indication of whether a next TF will be transmitted within the transmission opportunity; and
transmit the TF to the plurality of HE stations to initiate the simultaneous uplink transmissions from the plurality of stations within the transmission opportunity.

2. The apparatus of claim 1, wherein each OFDMA resource allocation further comprises a 20 MHz allocation sub-field that indicates a number of 20 MHz sub-channels allocated in the OFDMA resource allocation.

3. The apparatus of claim 2, wherein the one or more indications of the OFDMA sub-channel resource allocation for the corresponding HE station further comprise an indication of a location of the number of 20 MHz sub-channels.

4. The apparatus of claim 2, wherein the one or more indications of the OFDMA sub-channel resource allocation for the corresponding HE station further comprise an indication of whether a basic resource unit of the one or more indications of the OFDMA sub-channel resource allocation for the corresponding HE station is 26 tones or 242 tones.

5. The apparatus of claim 2, wherein the one or more indications of the OFDMA sub-channel resource allocation for the corresponding HE station further comprise an indication of a last sub-channel that is allocated to the corresponding HE station within the number of 20 MHz sub-channels.

6. The apparatus of claim 2, wherein the 20MHz allocation sub-field further indicates a bandwidth for the OFDMA sub-channel resource allocation.

7. The apparatus of claim 6, wherein the 20 MHz allocation sub-field indicates one from the following group:
zero 20 MHz sub-channels are allocated in the OFDMA resource allocation, one 20 MHz sub-channel is allocated in the OFDMA resource allocation, two 20 MHz sub-channels are allocated to one or two HE stations of the one or more HE stations in the OFDMA resource allocation, and three 20 MHz sub-channels are allocated to one or more HE stations of the one or more HE stations in the OFDMA resource allocation.

8. The apparatus of claim 1, wherein the one or more indications of the OFDMA sub-channel resource allocation for the corresponding HE station further comprise an indication of whether the OFDMA sub-channel resource allocation for the corresponding HE station is final or whether the one or more indications of the OFDMA sub-channel resource allocations include an additional OFDMA sub-channel resource allocation for the corresponding HE station.

9. The apparatus of claim 1, wherein each OFDMA resource allocation further comprises an indication of whether the one or more indications of the OFDMA sub-channels resource allocation for the corresponding HE station is a same resource allocation as a resource allocation of a previous HE station.

10. The apparatus of claim 1, wherein each OFDMA resource allocation comprises one or more indications of an address of one or more HE stations, and one or more indications of a width of an OFDMA sub-channel resource allocation for the corresponding HE station.

11. The apparatus of claim 10, wherein each OFDMA resource allocation further comprises an indication of whether the OFDMA resource allocation is for a single HE station of 80 MHz or for a plurality of HE stations each of less than 80 MHz.

12. The apparatus of claim 11, wherein each OFDMA resource allocation further comprises an indication of a position with a bandwidth of the OFDMA sub-channel resource allocation for the corresponding HE station.

13. The apparatus of claim 1, wherein the, master station is one from the following group:

an access point, an Institute of Electrical and Electronic Engineers (IEEE) 802.11 access point, an IEEE 802.11 station, an IEEE 802.11ax access point, and an IEEE 802.11ax station.

14. The apparatus of claim 1, wherein each resource allocation comprises an indication of a number of one or more HE stations.

15. The apparatus of claim 1, further comprising one or more nte as coupled to the circuitry.

16. The apparatus of claim 1, wherein the memory is configured to store the TF.

17. A method performed by an apparatus of an access point (AP), the method comprising:
generating a trigger frame (TF) comprising one or more resource allocations for simultaneous uplink transmissions, wherein each of the one or more resource allocations comprises an indication of whether the resource allocation is an orthogonal frequency division multiple access (OFDMA) resource allocation or a multiple-user multiple-input multiple-output (MU-MIMO) resource allocation, and an identity either of an OFDMA group or an MU-MIMO group, and wherein each resource allocation comprises an indication of a bandwidth for the OFDMA resource allocation or a bandwidth for the MU-MIMO resource allocation, wherein each OFDMA resource allocation comprises one or more indications of an address of a plurality of high-efficiency (HE) stations and one or more indications of an OFDMA sub-channel resource allocation for a corresponding HE station, wherein the TF further comprises an indication of a duration of a transmission opportunity obtained by the master station and an indication of whether a next TF will be transmitted within the transmission opportunity; and
transmitting the TF to the plurality of HE stations to initiate the simultaneous uplink transmissions from the plurality of stations within the transmission opportunity.

18. A station, the station comprising: memory; and, circuitry coupled to the circuitry, wherein the circuitry is configured to:
receive a trigger frame (TF) from a master station comprising one or more resource allocations, wherein each of the one or more resource allocations comprises an indication of whether the resource allocation is an orthogonal frequency division multiple access (OFDMA) resource allocation or a multiple-user multiple-input multiple-output (MU-MIMO) resource allocation, and an identity either of an OFDMA group or an MU-MIMO group, and wherein each resource allocation comprises an indication of a bandwidth for the OFDMA resource allocation or a bandwidth for the MU-MIMO resource allocation, wherein each OFDMA resource allocation comprises one or more indications of an address of one or more high-efficiency (HE) stations and one or more indications of an OFDMA sub-channel resource allocation for the corresponding HE station, wherein the TF further comprises an indication of a duration of a transmission opportunity and an indication of whether a next TF will be transmitted within the transmission opportunity; and
transmit data to the master station in accordance with the TF.

19. The station of claim 18, further comprising one or more antennas coupled to the circuitry.

20. The station of claim 18, wherein the memory is configured to store the TF.

21. A non-transitory computer-readable storage medium that stores instructions for execution by one or more processors, the instructions to configure the one or more processors to cause a master station to:
generate a trigger frame (TF) comprising one or more resource allocations for simultaneous uplink transmissions, wherein each of the one or more resource allocations comprises an indication of whether the resource allocation is an orthogonal frequency division multiple access (OFDMA) resource allocation or a multiple-user multiple-input multiple-output (MU-MIMO) resource allocation, and an identity either of an OFDMA group or an MU-MIMO group, and wherein each resource allocation comprises an indication of a bandwidth for the OFDMA resource allocation or a bandwidth for the MU-MIMO resource allocation, wherein each OFDMA resource allocation comprises one or more indications of an address of a plurality of high-efficiency (HE) stations and one or more indications of an OFDMA sub-channel resource allocation for a corresponding HE station, wherein the TF further comprises an indication of a duration of a transmission opportunity obtained by the master station and an indication of whether a next TF will be transmitted within the transmission opportunity; and
transmit the TF to the plurality of HE stations to initiate the simultaneous uplink transmissions from the plurality of stations within the transmission opportunity.

* * * * *